Feb. 7, 1933.                J. F. SCHMERHEIM                1,896,788
                    MACHINE FOR CUTTING ICE CREAM BLOCKS
                         Filed Dec. 5, 1928        8 Sheets-Sheet 5

Inventor
John F. Schmerheim,
By Hull, Buck & West
Attorneys

Feb. 7, 1933.  J. F. SCHMERHEIM  1,896,788
MACHINE FOR CUTTING ICE CREAM BLOCKS
Filed Dec. 5, 1928   8 Sheets-Sheet 7

Inventor
John F. Schmerheim,
By Hull, Brock West,
Attorneys

Feb. 7, 1933. J. F. SCHMERHEIM 1,896,788
MACHINE FOR CUTTING ICE CREAM BLOCKS
Filed Dec. 5, 1928 8 Sheets-Sheet 8

Patented Feb. 7, 1933

1,896,788

UNITED STATES PATENT OFFICE

JOHN F. SCHMERHEIM, OF CLEVELAND, OHIO, ASSIGNOR TO THE KAY MACHINERY COMPANY, OF CLEVELAND, OHIO, A CORPORATION OF OHIO

MACHINE FOR CUTTING ICE CREAM BLOCKS

Application filed December 5, 1928. Serial No. 323,930.

This invention relates to machines of the type that are employed for cutting blocks of ice cream into "bricks" of varying size by feeding such blocks intermittently toward and beyond one or more reciprocating knives.

It is the general object of the invention to provide a machine of this character with means whereby the intermittent feeding movement imparted to the said block may be quickly, conveniently, and accurately varied, thereby to effect a like variation in the length and size of the bricks. A further object of the invention is to provide a machine of this character with means for automatically stopping the feeding movement of the block and its supporting carriage and the reciprocation of the knife or knives when the block and its support shall have been moved a predetermined distance toward the cutting knives, whereby the feeding and cutting actions may be automatically suspended when the last brick or series of bricks shall have been cut; also to provide for a machine of this character automatically operating means whereby the knife-operating mechanism may not be accidentally put into operation; also to provide a machine of this character with indicating means operatively connected with the carriage feeding means whereby variations in the length of the feeding strokes of the latter means may be quickly and conveniently obtained and indicated; also to provide for machines of this character an improved construction and mounting for the knives. Further and more detailed objects of the invention will appear hereinafter and will be realized in and through the construction and arrangement of parts shown in the drawings, wherein.

The machine described and illustrated herein comprises generally a supporting base, a bed carried by said base, a carriage reciprocably mounted on said bed, means for moving the said table intermittently toward and beyond a set of vertically reciprocating knives, means for reciprocating the said knives toward and from the said table, a motor, a shaft driven by said motor, connections between said shaft and the knives for reciprocating the latter, connections between said shaft and the carriage-feeding mechanism for feeding the carriage intermittently in one direction; means for varying the amplitude of the intermittent feeding movements of said table; an automatic switch for stopping the motor at the end of the forward travel of the carriage; and a safety lock for said switch.

Figure 3:
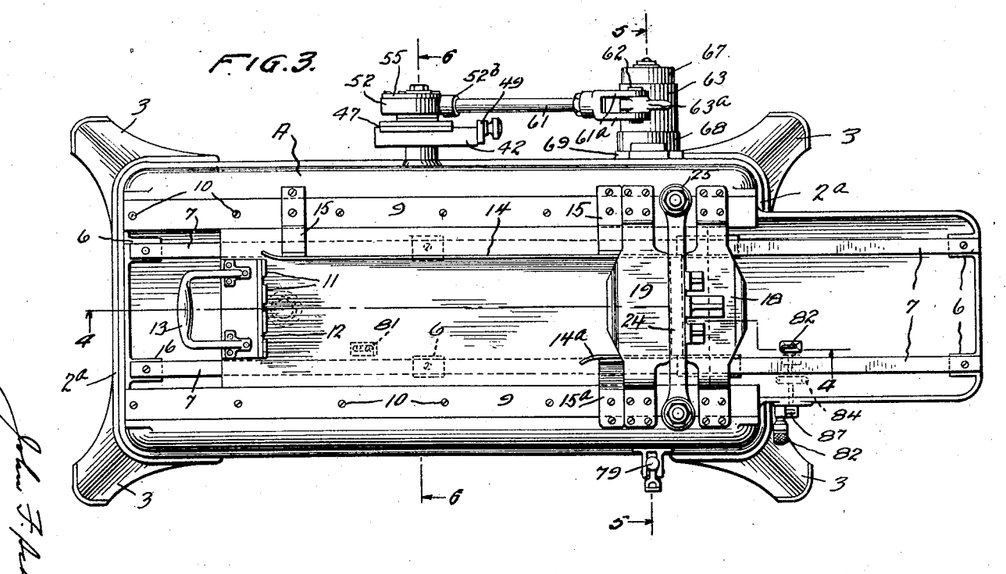
Figure 5:
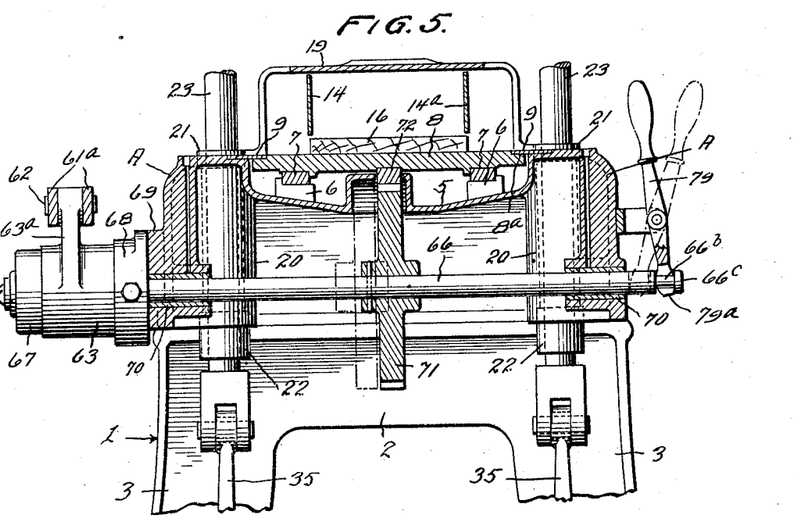
Figs. 5 and 6 are details in cross section corresponding respectively to the lines 5—5 and 6—6 of Fig. 3, certain parts being shown in elevation.
Figure 6:
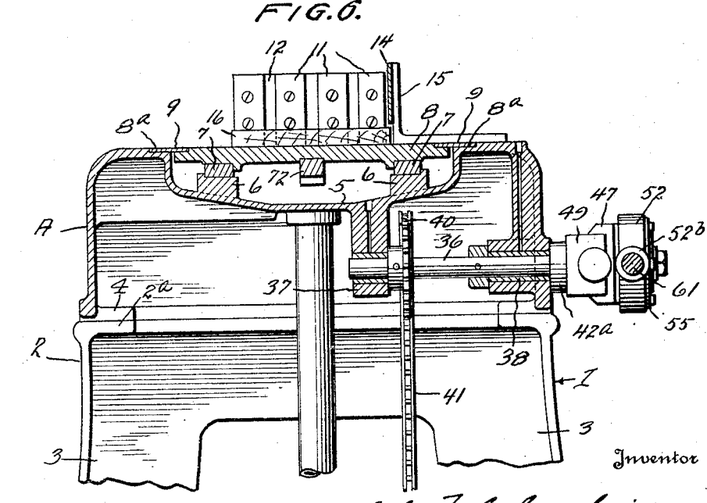
Figure 7:
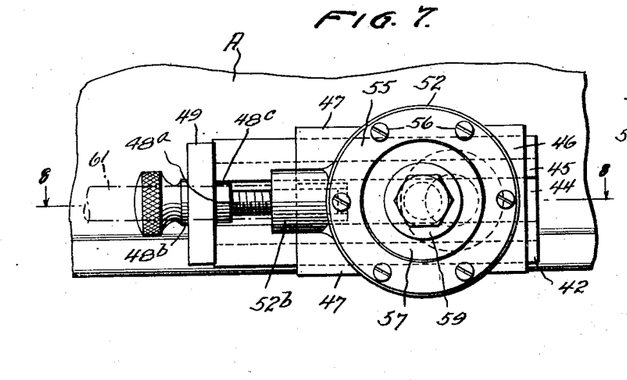
Fig. 7 an end elevation of the feed adjusting and indexing mechanism.
Figure 8:
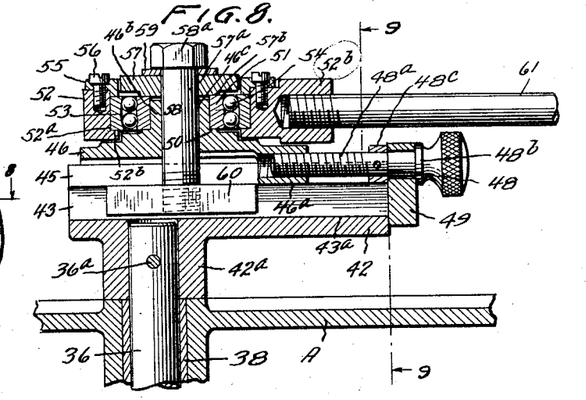
Fig. 8 a detail in section corresponding substantially to the line 8—8 of Fig. 7.
Figure 9:
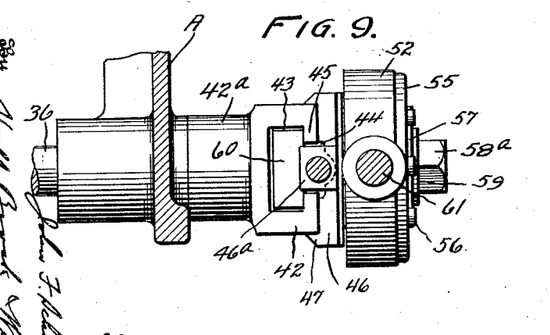
Fig. 9 a sectional elevation corresponding to the line 9—9 of Fig. 8.
Figure 10:
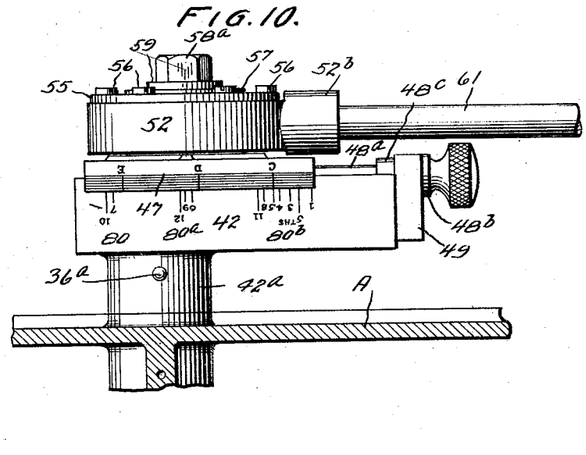
Fig. 10 a detail in plan of the mechanism shown in Fig. 7.
Figure 11:
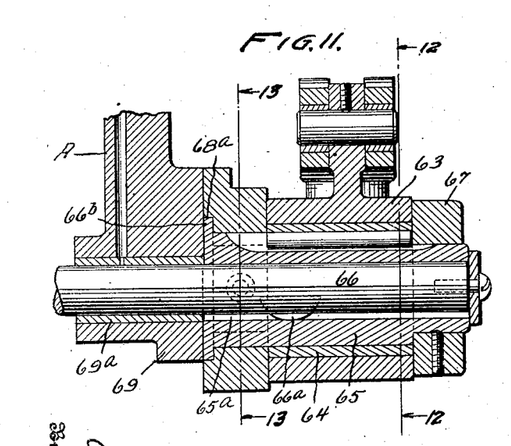
Fig. 11 a detail in longitudinal section through the mechanism for driving the shaft which feeds the block-supporting carriage.

Describing the parts by reference characters, 1 denotes a base having an upper bed-supporting portion 2 and supporting legs 3. Mounted on the base is a bed casting A comprising a horizontal inwardly extending flange 4 at the front and rear thereof adapted to seat upon corresponding flanges 2$^a$ on top of the upper portion 2 of the base. In addition to the flanges 4, the bed comprises a deck 5 which is preferably centrally depressed, having brackets 6 projecting upwardly therefrom, which brackets support longitudinal rails 7 on which the carriage 8 slides. Each lateral edge of the upper surface of the carriage is provided with a notch or rabbet 8$^a$ which receives the inner edge of a finishing and holding-down plate 9, each of these plates being also supported in rabbeted seats 6 in the top of the bed A, being secured to the top of said bed, as by screws 10 (see Figs. 3, 5 and 6).

The rear end of the carriage is provided with uprights 11 to which and the top of such rear ends there is secured an angular bracket 12 carrying an operating handle 13.

Figure 23:
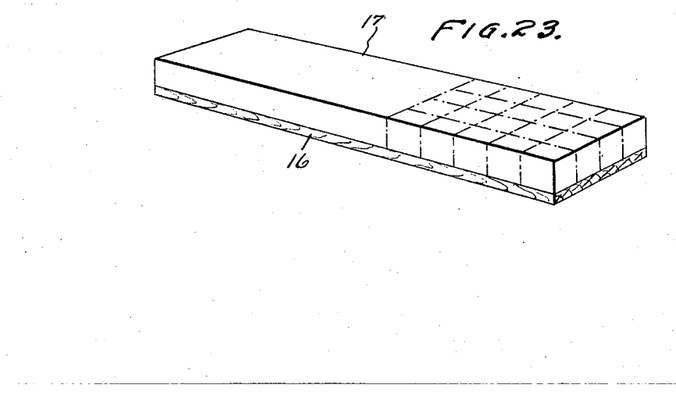
Fig. 23 a detail in perspective of a block of ice cream and its support.

At one side of the top of the bed is a long longitudinally extending guide plate 14, supported from the top of the bed by brackets 15. At the other side of the top of the bed and adjacent to the front of the same is a shorter guide plate 14$^a$ supported by one or more brackets 15$^a$. These guide plates are spaced apart the width of the board or table 16 which carries the ice cream block 17 (see Figs. 5 and 23).

Figures 4, 22:
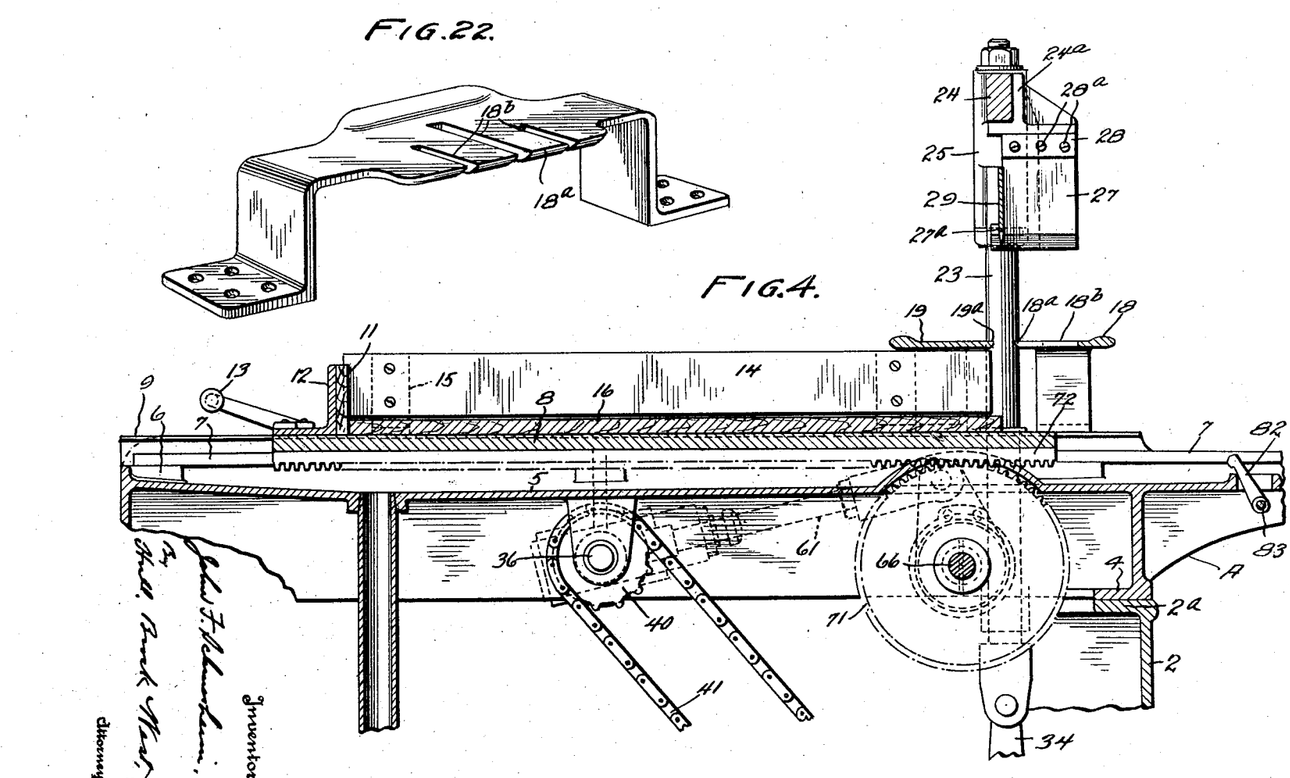
Fig. 4 a longitudinal sectional view of the said machine corresponding to the line 4—4 of Fig. 3.
Fig. 22 a detail in perspective of one of the stripper frames.

Secured to the top of the bed A and extending across the deck 5 and above and across the board or table 16 are front and rear stripper frames, indicated respectively at 18 and 19. The stripper frame 19 is provided with a transverse front edge 19$^a$ and the stripper frame 18 with a transverse rear edge 18$^a$ between which edges the transverse knife (to be described hereinafter) may rise and fall, the adjacent edges of the stripper frame being so positioned as to strip from the said transverse knife any bricks of ice cream that may tend to adhere thereto. The front stripper frame is provided with a plurality of longitudinally extending slots 18$^b$ for the longitudinal knives to be described hereinafter), three such slots being shown (see Figs. 4 and 22).

Cutting mechanism

The cutting mechansm comprises a cross head connected to a pair of vertically reciprocable rods driven by cranks and connecting rods from the motor shaft, the rods being so positioned and supported as to move the knives in operative relation to the stripping frames which have been described.

The bed A is preferably formed as a casting and has guide sleeves 20 formed therewith. In the top and bottom of each guide sleeve there is driven a journal sleeve, the said sleeves being designated at 21 and 22 (see Fig. 5). Rods 23 are slidably mounted in these journal sleeves and have mounted on the upper ends thereof a cross head which consists generally of an upper transverse frame 24 which is carried by sleeves 25 mounted on top of the rods 23. Secured to the cross head 24 are longitudinally extending brackets comprising each a base portion 24$^a$ which is secured to the cross bar and each of which has an angular seat 26 for the upper end and one side of a longitudinal blade 27, the said blades being secured to the brackets by means of blocks 28 and bolts 28$^a$, the bolts extending through apertures in the upper ends of the blades and serving to press the faces of the blades opposite said blocks against the longitudinal sides of the said angular seats.

Figure 1:
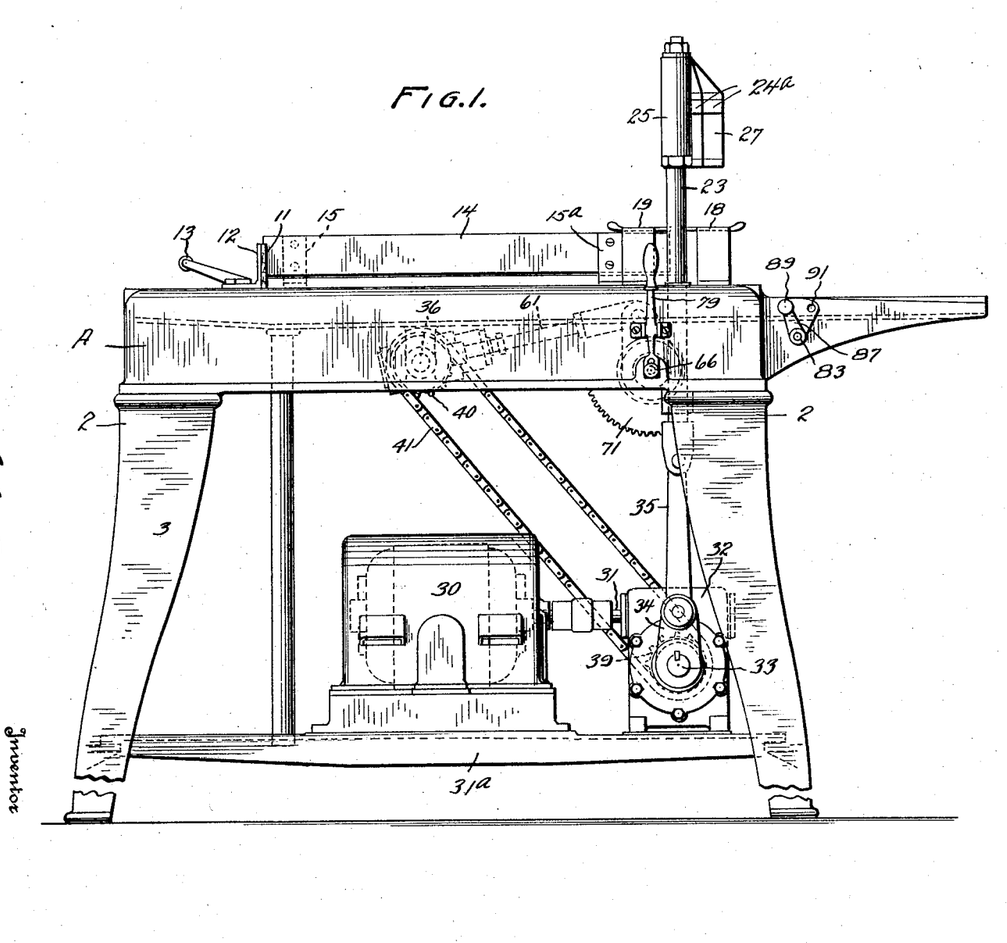
Fig. 1 represents a side elevation, Fig. 2 a front elevation, and Fig. 3 a plan view of a machine embodying my invention.
Figure 2:
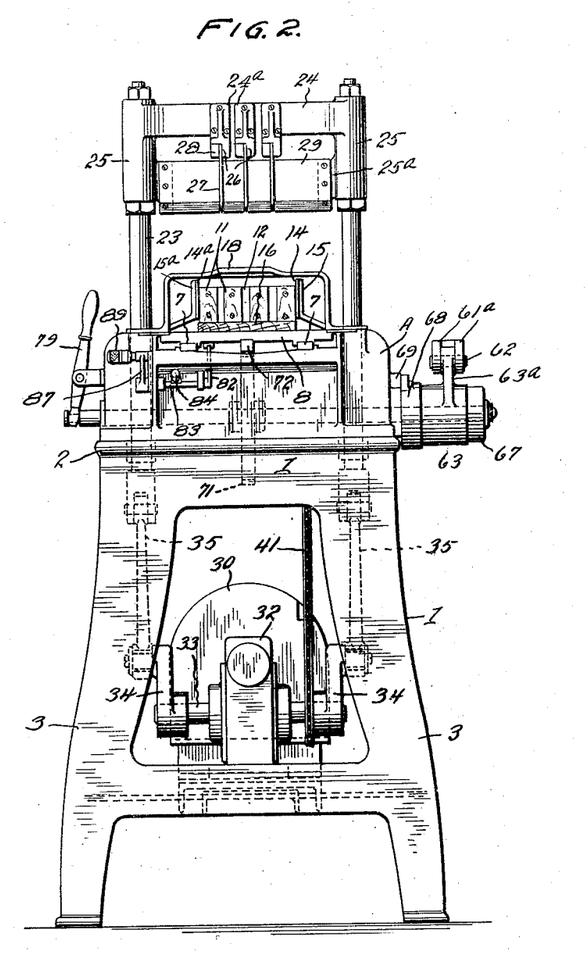
Figures 16, 18, 19, 20, 21:
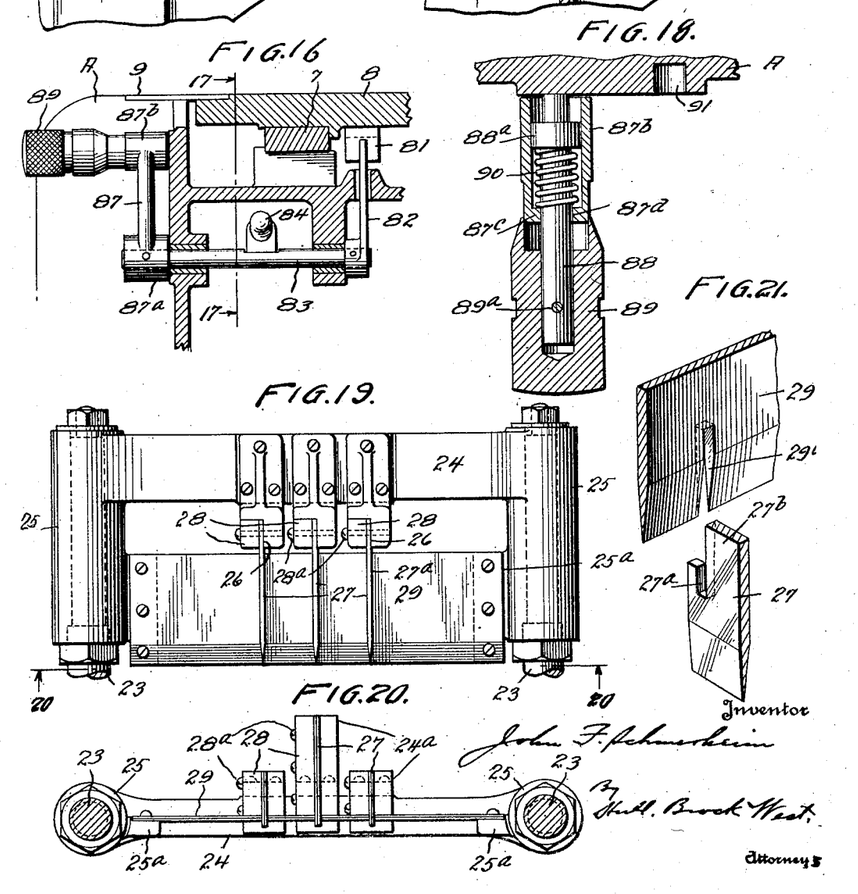
Fig. 16 a detail in section corresponding to the line 16—16 of Fig. 15.
Fig. 18 a detail in section through the handle for resetting the switch mechanism and through the cooperating part of the frame of the machine.
Fig. 19 a front elevation of the knives and their mounting.
Fig. 20 a sectional elevation corresponding to the line 20—20 of Fig. 19.
Fig. 21 a detail in perspective of the transverse knife and one of the longitudinal knives.
Figure 17:
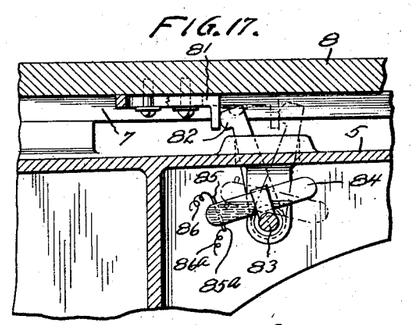
Fig. 17 a detail in section corresponding to the line 17—17 of Fig. 16.

Each sleeve 25 is provided with an inwardly extending supporting bracket 25$^a$ to which brackets are bolted the opposite lateral edges of the transverse blade 29. The manner in which the blades are assembled is shown in Figs. 2 and 21, from which it will appear that the transverse blade 29 is provided with vertical slots 29$^a$ one for each longitudinal blade 27, the said slots extending upwardly from the bottom of the blade 29. Each blade 27 is provided near the rear thereof with a vertical slot 27$^a$ extending downwardly from the top thereof, the bottom of each slot being so positioned that, when the bottom of the said slot and the top of one of the slots 29$^a$ are in engagement, the lower edges of the blades 27 and 29 will be in substantially the same horizontal plane. It will be noted that the portion of each blade 27 which is at the rear of the slot 27$^a$ does not extend for the full height of said blade, each blade being secured in its seat 26 by its front portion 27$^b$.

Knife-driving mechanism

The mechanism for driving the knives as well as for intermittently advancing the carriage 8 includes an electric motor 30 having a shaft 31 and supported on a platform 31$^a$ carried by the base; it also includes a gear reduction box 32 provided with reducing gears (not shown) by which a transverse shaft 33 is driven, the gear reduction box and the shaft 33 being also supported on the platform 31$^a$. The knives are reciprocated by means of cranks 34 secured at opposite ends to the shaft 33 and connecting rods 35 driven by said cranks and connected at their opposite ends to the lower ends of the rods 23.

Carriage feeding mechanism

The carriage feeding mechanism comprises a rack on the bottom of the carriage, a transverse shaft below said rack having a gear thereon adapted to mesh with said rack, and connections including a second transverse shaft for intermittently driving the gear-carrying shaft in one direction, as will now be described in detail.

36 denotes a shaft journaled at one end in a bracket 37 depending from the deck 5 of the bed A and supported adjacent to its other side in a journal 38 in the lower end of one side of the bed. This shaft is driven constantly while the motor is running by means of a sprocket 39 on the shaft 33 and a sprocket 40 on the shaft 36 and a chain 41. The outer end of the shaft 36 is secured by a pin 36$^a$ to a hub 42$^a$ on a crank arm 42 extending radially outwardly from the end of the shaft 36 and having a guideway 43 provided with a closed bottom 43$^a$ and a slot 44 opposite said bottom formed between inwardly extending flanges 45.

46 denotes a supporting block having depending flanges 47 extending on opposite sides of the crank arm 42 and having an internally threaded extension 46$^a$ interposed between the flanges 45. This threaded extension receives the threaded end 48$^a$ of a screw 48 which is rotatably mounted in a thrust block 49 adapted to bear against the end of the arm 42 which is remote from the shaft 36. The screw 48 is provided with an integral collar 48$^b$ adapted to engage the outer face of the thrust block 49 and has secured thereto an inner collar 48$^c$ adapted to engage the inner face of said thrust block.

The block 46 is provided with a hub 46$^b$ and with a bore 46$^c$ extending through such hub. At the bottom of the hub is a horizontal annular seat 50 for the bottom of the inner race 51 of an annular ball bearing. 52 represents a collar having an inner cylindrical surface 52$^a$ for the outer cylindrical surface of an outer ball race 53 and also having a horizontal annular seat 52$^b$ at the bottom thereof for the bottom of said ball race. Anti-friction balls 54 are interposed between the inner and outer races, and the outer race is shown as held to its seat by means of a locking ring 55 secured to the collar 52 by means of short bolts 56.

57 denotes a disk having a central opening 57$^a$ registering with the bore 46$^c$ and having a centrally depressed lower face 57$^b$ adapted to engage the upper end of the inner ball race 51 and hold the same on its seat.

58 denotes a bolt extending through the bores 57$^a$ and 46$^c$ and through the slot between the flanges 45, the bolt being provided with a head 58$^a$ resting on a washer 59. The lower end of this bolt is threaded into a block 60 which is slidably mounted in the guideway 43 and is approximately of the width of said guideway, being somewhat less in depth than the depth of the guideway.

The collar 52 is provided with an internally threaded extension 52$^b$ into which is threaded one end of a connecting rod 61. The opposite end of this rod is forked, as shown at 61$^a$, and connected by a pivot pin 62 with an arm 63$^a$ projecting from a hub 63.

This hub is provided with a hardened bushing 64 having a driving fit therein, the said hub and bushing being rotatably mounted upon a bushing 65 secured to the transverse shaft 66 by means of a key 66$^a$ carried by the shaft and entering an elongated keyway 65$^a$ in the last mentioned bushing. The bushing 65 extends beyond the outer end of the hub 63 and has secured thereto a thrust collar 67.

The bushing 65 extends inwardly beyond the hub 63 and is provided with a shoulder 66$^b$ at its inner end which fits into an annular seat 68$^a$ at the inner end of a collar 68 between which and the collar 67 the hub is mounted. The inner ends of the bushing 65 and collar 68 bear against a boss 69 on the lower end of the side of the bed A which is adjacent to said collar; and the shaft 66 extends through a journal 69$^a$ in such lower end of the side and has its opposite end mounted in a journal 70 in the lower end of the opposite side of the bed, the shaft being slidably mounted in the said journals and being provided intermediate the ends thereof with a gear 71 adapted to mesh with a rack 72 on the underside of the carriage 8.

Figure 12:
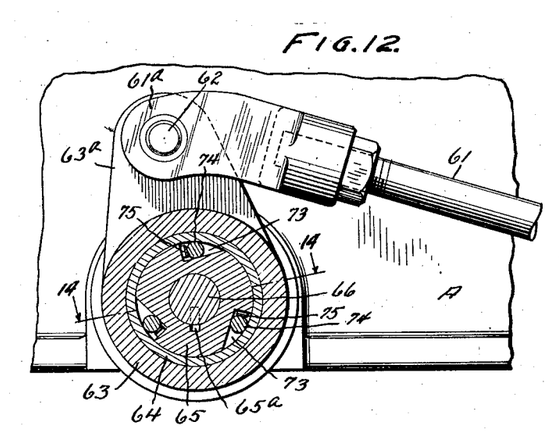
Figs. 12 and 13 details in section corresponding respectively to the lines 12—12 and 13—13 of Fig. 11.
Figure 13:
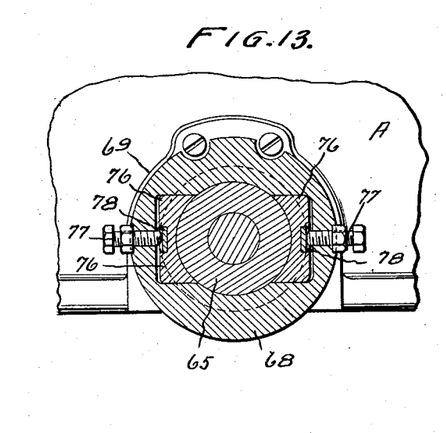
Figure 14:
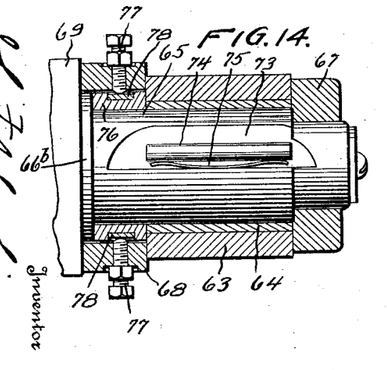
Fig. 14 a detail in section corresponding to the line 14—14 of Fig. 12, the inner clutch bushing being shown in elevation.
Figure 15:
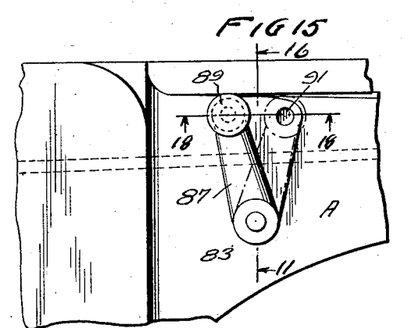
Fig. 15 a detail in side elevation of the switch operating mechanism which controls the carriage-feeding and knife-reciprocating mechanisms.

In order to drive the shaft 66 in one direction only, a roller clutch is provided between the bushings 64 and 65, the latter bushing being provided with inclined pockets 73 with rollers 74 therein and springs 75 back of said rollers and tending to force them into engagement with the inner face of the bushing 64. It will be evident that, with this arrangement, the shaft 66 will be rotated only by movements of the bushing 64 in a counter-clockwise direction (see Fig. 12).

In order to prevent reverse rotation of the shaft 66 due to the movement of the bushing 64 in the opposite or clockwise direction, I provide a friction brake for the bushing 65, said brake consisting of a pair of opposed brake blocks 76 mounted in the collar 68 and held in adequate frictional engagement with opposed surfaces of the bushing 65 by means of screws 77 engaging hardened inserts 78 in the brake blocks.

By virtue of the connections interposed between the shaft 36 and the shaft 66, it will be evident that the latter shaft will be driven intermittently only in one direction and that the extent of each intermittent movement may be varied by merely turning the screw 48 to move the bolt 58, with its block 60, toward or from the axis of the shaft 36, with like variations in the throw of the crank on which the collar 52 is mounted.

The end of the shaft 66 which is opposite the hub 63 is provided with a reduced portion 66$^b$ and a head 66$^c$ at the end thereof beyond such reduced portion. Above this end of the shaft there is pivoted a lever 79 having a fork 79$^a$ at its lower end adapted to embrace the reduced portion 66ᵇ of the shaft. By operating the lever 79, the shaft 66 may be moved axially of itself thereby to move the gear 71 into and out of engagement with the rack 72, such disengagement being advantageous when it is desired to return the carriage to the rear or block-receiving end of the bed at the end of the brick-cutting operation. The operator merely moves the lever 79 in the appropriate direction, as indicated by dot-and-dash lines on Fig. 5, which will disengage the gear 71 from the rack 72 and enable him to pull the carriage bodily rearwardly by the handle 13. When the carriage is in its rearward position, he then moves the lever in the opposite direction, thereby bringing the gear and rack into engagement.

In order to enable the operator conveniently to vary the feeding stroke of the carriage so as to cut a brick of the desired length (the term "length" referring to the fore-and-aft dimension of the brick) I have provided the block 42 with series of numbered lines 80, 80ᵃ and 80ᵇ and the cooperating flange 47 of the block 46 with lines C, D and E. When one of the lines on the flanges 47 is brought into register with a line on the block 42, the crank pin will have been set to a position which will cause the knife 29 to cut the bricks to a length corersponding to such registering indications. The length of the bricks, or the number of bricks to the quart or gallon, can be readily determined by reference to a table in the possession of the operator.

*Automatic stop mechanism*

The automatic stop mechanism as shown herein comprises a mercury switch mounted on a shaft, an arm carried by said shaft and adapted to be engaged by the carriage, an operating handle for resetting the said shaft and switch, and an automatic lock for locking the shaft and the switch in circuit-breaking position.

Referring more particularly to Figs. 1 and 15 to 18 inclusive, it will be seen that the carriage is provided with a downwardly extending projection 81 which is adapted to engage the upper end of an arm 82 secured to a short rock shaft 83, the said rock shaft carrying a mercury switch comprising a tube 84 and terminals 85, 85ᵃ which, when covered by the mercury, close the circuit to the motor 30 through wires 86, 86ᵃ. When the carriage has been advanced the maximum desired distance (as when the last brick has been cut from the block of ice cream) the projection 81 strikes the upper end of the arm 82 and rocks it to the position shown in dot-and-dash lines, thereby tilting the tube 84 and allowing the mercury to run down to the right hand end of said tube, breaking the connection between the terminals 85 and 85ᵃ. This results in opening the motor circuit and in suspending both the carriage-feeding operation and the knife-reciprocating operation.

The outer end of the shaft is provided with a handle comprising an arm 87 having a hub 87ᵃ pinned to the shaft. The upper end of the arm 87 has a sleeve 87ᵇ formed therewith, the outer end of this sleeve being provided with a head 87ᶜ having a central perforation 87ᵈ through which a rod 88 extends. This rod is secured at its outer end to a knurled handle 89, as by a pin 89ᵃ, and has within the sleeve 87ᵇ a collar 88ᵃ between which and the head 87ᶜ there is interposed a spring 90, which spring presses the rod and the handle 89 toward the adjacent side of the forward part of the bed frame A. This bed frame is provided with a recess 91 forming a seat into which the adjacent end of the rod 88 will be pressed by the spring 90 when the said end of the rod and the said recess are in register, which is when the motor circuit is open. This locks the switch in circuit-breaking position and prevents the accidental resetting of the switch, which would cause the knives to reciprocate, with resultant risk of injury to the operator.

As is well known to those familiar with the art to which this invention relates, the ice cream blocks are supported on pans or trays of appropriate size and shape and are transferred from the latter to the boards or tables 16. This transfer is usually accomplished by dipping the pans into hot water for a length of time sufficient to soften the ice cream and enable it to drop from the pans upon the boards or tables. However, this operation of softening the bottom and edges of the blocks requires considerable time. In order to shorten the time, I provide the machine with a compressor driven from the shaft 33 and pumping air into a tank from which a valve-controlled hose is led to the rear of the machine or other place convenient of access to the pans containing the ice cream blocks. By providing the bottom of each pan with an aperture and delivering compressed air from the hose through such aperture, the block in such pan will be quickly dislodged, after a materially shorter time for warming and softening the edges and bottom of the blocks than if the blocks were removed from their pans in the ordinary manner.

From the foregoing description, it will be apparent that I have produced a machine of the character described which is safe and efficient in operation; which will enable the operator conveniently and quickly to cut a block of ice cream into bricks of any desired length and which is so constructed as to withstand all ordinary incidents of use.

Having thus described my invention, what I claim is:

1. In a machine of the character described, the combination of a bed, a knife-carrying frame reciprocable toward and from said bed, a carriage movable along said bed toward and from said frame, an electric motor, connections between said motor and said carriage for feeding the carriage intermittently toward the said frame, connections between said motor and said frame for reciprocating the latter, means for varying the amplitude of the intermittent feeding movements of the carriage, a switch for opening and closing the motor circuit arranged to be operated by the carriage to open said circuit when the carriage shall have been fed a predetermined distance, and means for automatically locking the said switch in circuit-opening position.

2. In a machine of the character described, the combination of a bed, a knife-carrying frame reciprocable toward and from said bed, a carriage movable along said bed toward and from said frame, an electric motor, connections between said motor and said carriage for feeding the carriage intermittently toward and beyond the said frame, connections between said motor and said frame for reciprocating the latter, a switch for opening and closing the motor circuit arranged to be operated by the carriage to open said circuit when the carriage shall have been fed a predetermined distance, and means for automatically locking the said switch in circuit-opening position.

In testimony whereof, I hereunto affix my signature.

JOHN F. SCHMERHEIM.